United States Patent
Palacios Valdueza et al.

(10) Patent No.: US 10,634,360 B2
(45) Date of Patent: Apr. 28, 2020

(54) GAS CONTROL VALVE, HOB AND GAS OVEN

(71) Applicant: BSH Hausgeräte GmbH, Munich (DE)

(72) Inventors: Luis Antonio Palacios Valdueza, Astillero (ES); Emilio Placer Maruri, Liencres (ES); Roberto Saiz Gonzalez, Villapresente-Cantabria (ES)

(73) Assignee: BSH Hausgeräte GmbH, Munich (DE)

( * ) Notice: Subject to any disclaimer, the term of this patent is extended or adjusted under 35 U.S.C. 154(b) by 358 days.

(21) Appl. No.: 15/309,807

(22) PCT Filed: May 15, 2015

(86) PCT No.: PCT/IB2015/053593
§ 371 (c)(1),
(2) Date: Nov. 9, 2016

(87) PCT Pub. No.: WO2015/181669
PCT Pub. Date: Dec. 3, 2015

(65) Prior Publication Data
US 2017/0167732 A1 Jun. 15, 2017

(30) Foreign Application Priority Data

May 28, 2014 (ES) .................................. 201430797

(51) Int. Cl.
*F24C 3/12* (2006.01)
*F23N 1/00* (2006.01)
(Continued)

(52) U.S. Cl.
CPC ............. *F24C 3/124* (2013.01); *A47J 27/002* (2013.01); *A47J 36/00* (2013.01); *F23N 1/00* (2013.01);
(Continued)

(58) Field of Classification Search
CPC .......... F24C 3/124; F47J 27/002; F57J 36/00; F23D 11/46; F23N 2027/10; F23N 5/022; F23N 1/007
(Continued)

(56) References Cited

U.S. PATENT DOCUMENTS 3,404,673 A * 10/1968 Tappan .................. F24C 3/027
126/39 H
3,442,448 A 5/1969 Body et al.
(Continued)

FOREIGN PATENT DOCUMENTS

DE 102010030944 A1 1/2012
EP 0027898 A2 5/1981
(Continued)

OTHER PUBLICATIONS

National Search Report ES P 201430797 dated Oct. 16, 2014.
International Search Report PCT/IB2015/053593 dated Jan. 15, 2016.

*Primary Examiner* — Vivek K Shirsat
*Assistant Examiner* — Ko-Wei Lin
(74) *Attorney, Agent, or Firm* — Michael E. Tschupp; Andre Pallapies; Brandon G. Braun

(57) ABSTRACT

A gas control valve for a hob includes a valve housing, and a valve body accommodated in the valve housing. The valve body is rotatable in a predetermined direction of rotation from a closed position, in which the gas control valve is closed, into an open position, in which the gas control valve is open. The valve body is rotatable in the predetermined direction of rotation beyond the open position into a low-flame position when the valve body is rotated from the open position into the low-flame position for controlling a flow volume of combustion gas flowing through the gas control valve/The valve body is rotatable in opposition to the predetermined direction of rotation from the open position
(Continued)

into a booster position, in which the flow volume of combustion gas is greater than the flow volume of combustion gas in the open position.

17 Claims, 6 Drawing Sheets

(51) Int. Cl.
*A47J 27/00* (2006.01)
*A47J 36/00* (2006.01)

(52) U.S. Cl.
CPC .............. *F23N 1/005* (2013.01); *F23N 1/007* (2013.01); *F23N 2237/02* (2020.01); *F23N 2237/10* (2020.01); *F23N 2237/20* (2020.01); *F23N 2241/08* (2020.01)

(58) Field of Classification Search
USPC .................. 431/12, 36–37, 72; 126/39 R, 42
See application file for complete search history.

(56) References Cited

U.S. PATENT DOCUMENTS 4,588,371 A * 5/1986 Nakamura .............. F23N 5/006
126/93
2008/0216810 A1 9/2008 Clauss et al.

FOREIGN PATENT DOCUMENTS

| JP | 2014081108 A | * | 5/2014 | ............ F16K 11/056 |
| WO | 2004038267 A1 | | 5/2004 | |
| WO | 2008141916 A2 | | 11/2008 | |

\* cited by examiner

GAS CONTROL VALVE, HOB AND GAS OVEN

CROSS-REFERENCES TO RELATED APPLICATIONS

This application is the U.S. National Stage of International Application No. PCT/EP2015/053593, filed May 15, 2015, which designated the United States and has been published as International Publication No. WO 2015/181669 A1 and which claims the priority of Spanish Patent Application, Serial No. P201430797, filed May 28, 2014, pursuant to 35 U.S.C. 119(a)-(d).

BACKGROUND OF THE INVENTION

The present invention relates to a gas control valve, a hob and a gas oven.

A gas control valve for a gas hob can comprise a valve body, which is accommodated in a valve housing. To control a flow of combustion gas which flows through the gas control valve, the valve body is rotatably accommodated in the valve housing. The valve body can be rotated from a closed position into an open position and beyond the open position into a low-flame position. The flow of combustion gas flowing through the gas control valve can be continuously adjusted between the open position and the low-flame position. It is desirable for an increased burner output to be available at least occasionally.

DE 10 2010 030 944 A1 describes a method and a gas oven, in which in addition to a standard gas flow, an additional gas flow can be adjusted. Both gas flows are supplied to the same gas burner.

BRIEF SUMMARY OF THE INVENTION

Against this background an object of the present invention consists in providing an improved gas control valve.

Accordingly, a gas control valve for a hob is proposed with a valve housing and a valve body accommodated in the valve housing, wherein the valve body can be rotated in a predetermined direction of rotation from a closed position, in which the gas control valve is closed, into an open position, in which the gas control valve is open, wherein the valve body can be rotated in the predetermined direction of rotation beyond the open position into a low-flame position, wherein when the valve body is rotated from the open position into the low-flame position, a flow volume of combustion gas that can flow through the gas control valve can be controlled, in particular continuously, wherein the valve body can be rotated against the predetermined direction of rotation from the open position into a booster position and wherein the flow volume of combustion gas is greater in the booster position than in the open position.

The booster position can also be referred to as a maximum-flame or additional-flame position. As a result of the valve body being rotatable from the open position into the booster position, in comparison with known arrangements it is possible to dispense with an additional gas flow. This ensures a simple and cost-effective design of the gas control valve.

According to one embodiment, the flow volume of combustion gas in the booster position is constant.

Contrary to this, the flow volume of combustion gas can be controlled continuously or in stages when the valve body is rotated from the open position into the low-flame position.

According to a further embodiment, the gas control valve has a timer device, which is designed to rotate the valve body automatically from the booster position into the open position after a predetermined time interval has elapsed.

The predetermined time interval is preferably one minute, further preferably 30 seconds. It is thus possible for an increased burner output, for instance to heat a larger quantity of water, to be required briefly.

According to a further embodiment, the valve body can be pressed into the valve housing in order to rotate from the open position into the booster position.

In particular, the valve body can only then be rotated from the open position into the booster position if this is simultaneously pressed into the valve housing. This reliably prevents an unwanted rotation into the booster position.

According to a further embodiment, the gas control valve has a spring device, wherein the valve body can be pressed into the valve housing against a spring force of the spring device.

The spring device is preferably a spiral spring. In particular, the spring device is a compression spring. The spring device is arranged between a shoulder provided on the valve body and the valve housing.

According to a further embodiment, the valve body can be accommodated in the spring device.

This ensures a space-saving design of the gas control valve. The spring device is designed to push the valve body out of the valve housing.

According to a further embodiment, the valve housing can be attached to a main gas line of the hob.

This enables rapid and simple assembly of the valve housing on the main gas line.

According to a further embodiment, the valve body is tubular.

In particular, the valve body has a hollow cylinder-shaped geometry. A gas aperture is provided on the valve body, through which aperture combustion gas flows in the open position, in the low-flame position and in the booster position. The gas aperture is covered by the valve housing in the closed position.

Furthermore, a hob with a gas control valve of this type is proposed.

The hob is in particular a gas hob. The hob is in particular an integral part of a domestic appliance.

Furthermore, a gas oven with a gas control valve of this type and/or a hob of this type is proposed.

Further possible implementations of the invention also comprise combinations—not explicitly cited—of features or forms of embodiment described above or below in respect of the exemplary embodiments. Here the person skilled in the art will also add individual aspects as improvements or amendments to the respective basic form of the gas control valve, the hob and/or the gas oven.

BRIEF DESCRIPTION OF THE DRAWINGS

Further advantageous embodiments and aspects of the invention are the subject matter of the dependent claims as well as the exemplary embodiments of the invention described below. The invention is also described in greater detail on the basis of preferred forms of embodiment with reference to the attached figures.

DETAILED DESCRIPTION OF EXEMPLARY EMBODIMENTS OF THE PRESENT INVENTION

Figure 1:
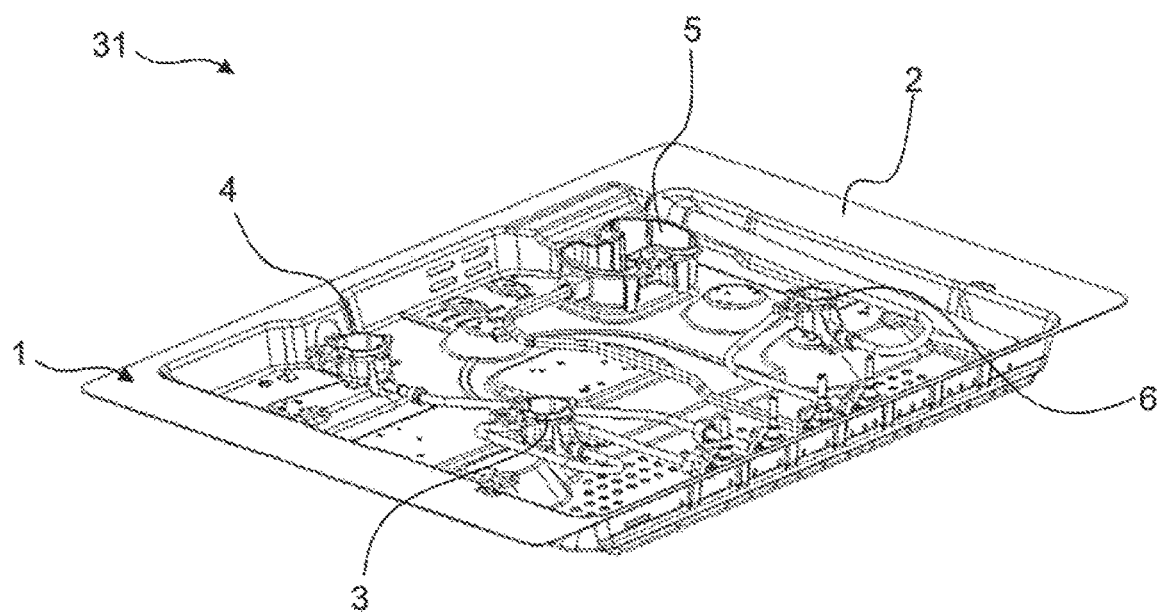
FIG. 1 shows a schematic perspective view of an embodiment of a gas hob.

Elements which are the same or have the same function have been provided with the same reference characters in the figures, unless specified otherwise.

Figure 2:
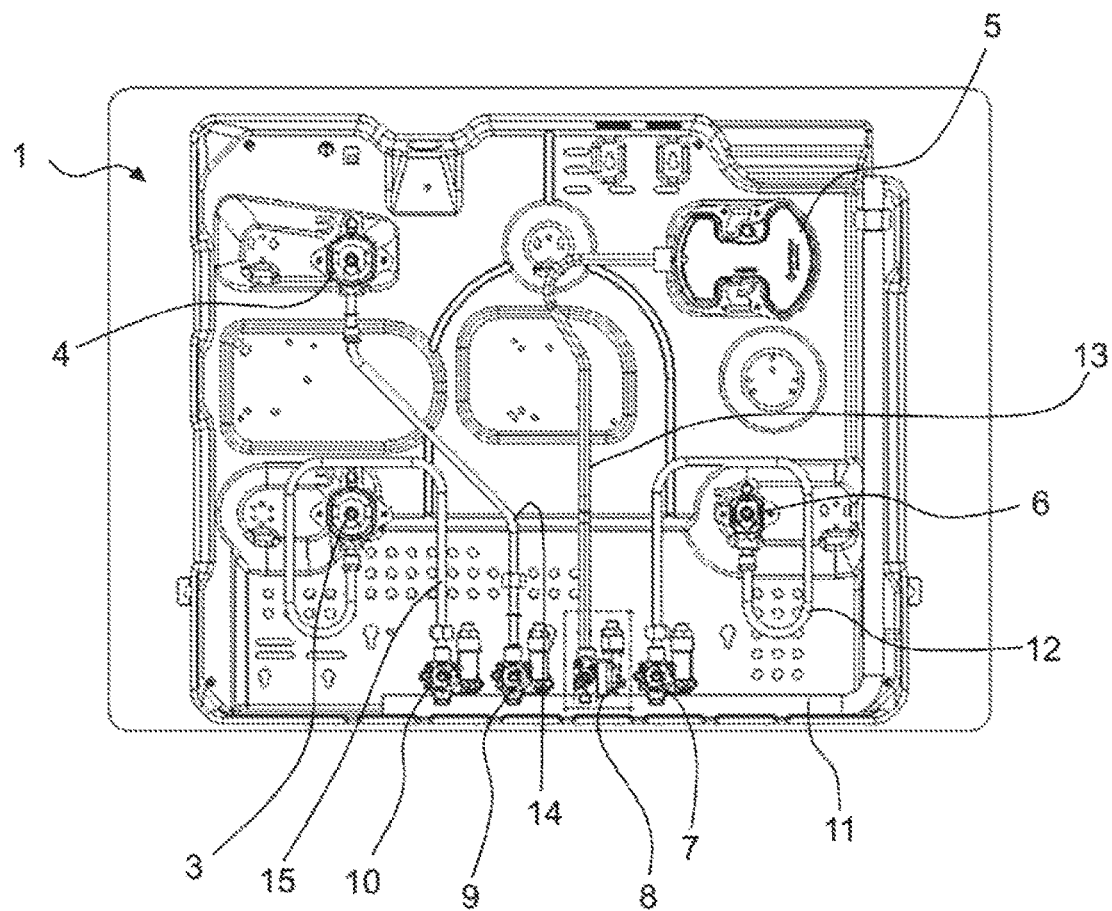
FIG. 2 shows a schematic top view of the gas hob according to FIG. 1.

FIG. 1 shows a schematic perspective view of a hob, in particular a gas hob 1. FIG. 2 shows a schematic top view of the gas hob 1. The gas hob 1 has a trough-shaped bottom panel 2, in which gas burners 3 to 6 are at least partially accommodated. A gas control valve 7 to 10 is assigned to each gas burner 3 to 6. The gas control valves 7 to 10 are arranged on a main gas line 11. The gas control valves 7 to 8 are fluidically connected to the respective gas burners 3 to 6 by way of supply lines 12 to 15. The gas control valves 7 to 10 are designed to control, in particular continuously, a flow volume of combustion gas flowing from the main gas line 11 to the respective gas burners 3 to 6.

Figure 3:
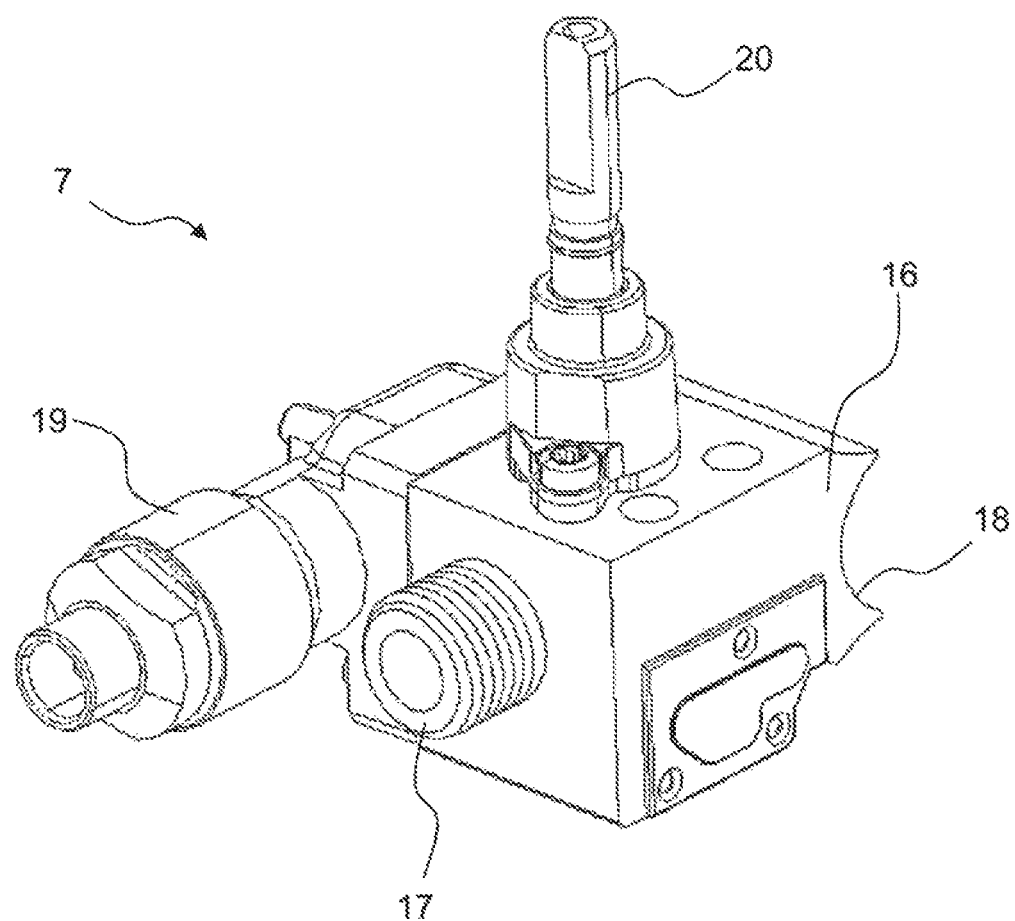
FIG. 3 shows a schematic perspective view of an embodiment of a gas control valve of the gas hob according to FIG. 1.

FIG. 3 shows a schematic perspective view of an embodiment of the gas control valve 7. The gas control valves 8 to 10 are preferably embodied analogously to the gas control valve 7. To simplify matters, reference is only made below to gas control valve 7. The gas control valve 7 has a valve housing 16. The valve housing 16 comprises a gas outlet 17, by way of which combustion gas can be supplied to the respective gas burner 3 to 6 with the aid of the corresponding supply line 12 to 15. The valve housing 16 further comprises a receiving section 18, which is designed to at least partially encompass the main gas line 11. In other words the valve housing 16 can at least partially accommodate the main gas line 11 in the receiving section 18. A gas inlet (not shown), through which combustion gas can be fed from the main gas line 11 to the valve housing 16, is provided on the receiving section 18. The gas control valve 7 can be clamped to the main gas line 11 with the aid of the receiving section 18.

A thermoelement receptacle 19 is provided on the valve housing 16. The thermoelement receptacle 19 is connected to a thermoelement assigned to the respective gas burner 3 to 6 such that a flame monitoring of the gas burners 3 to 6 is possible with the aid of the thermoelement. In other words, when the gas flame goes out, the gas control valve 7 blocks the flow of combustion gas to the respective gas burner 3 to 6, so that combustion gas can no longer flow from the gas control valve 7 to the gas burner 3 to 6. An actuating shaft 20 protrudes from the top of the valve housing 16. A rotary knob for actuating the actuating shaft 20 can be provided thereon for instance.

Figure 4:
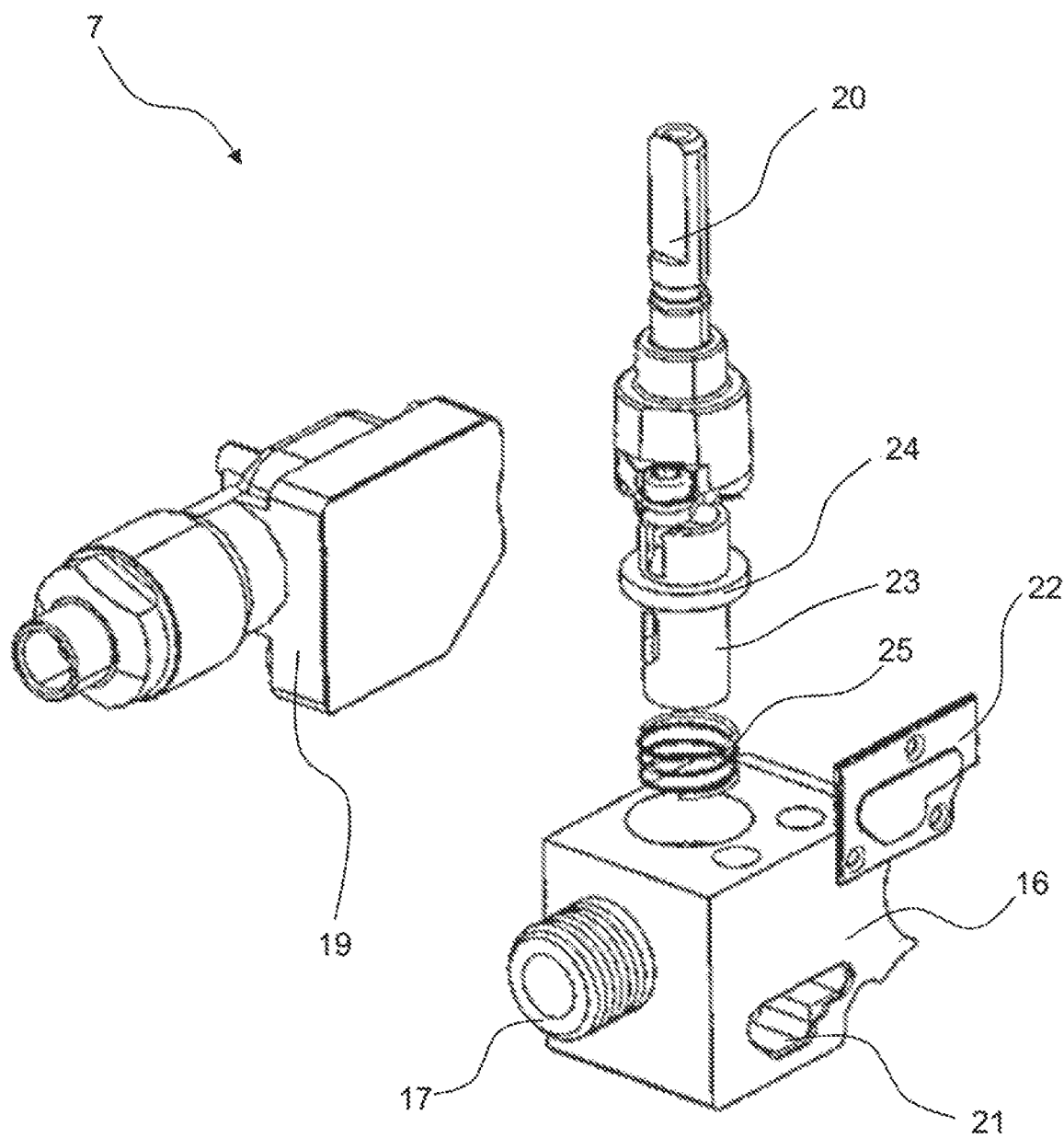
FIG. 4 shows a schematic perspective exploded view of the gas control valve according to FIG. 3.
Figure 5:
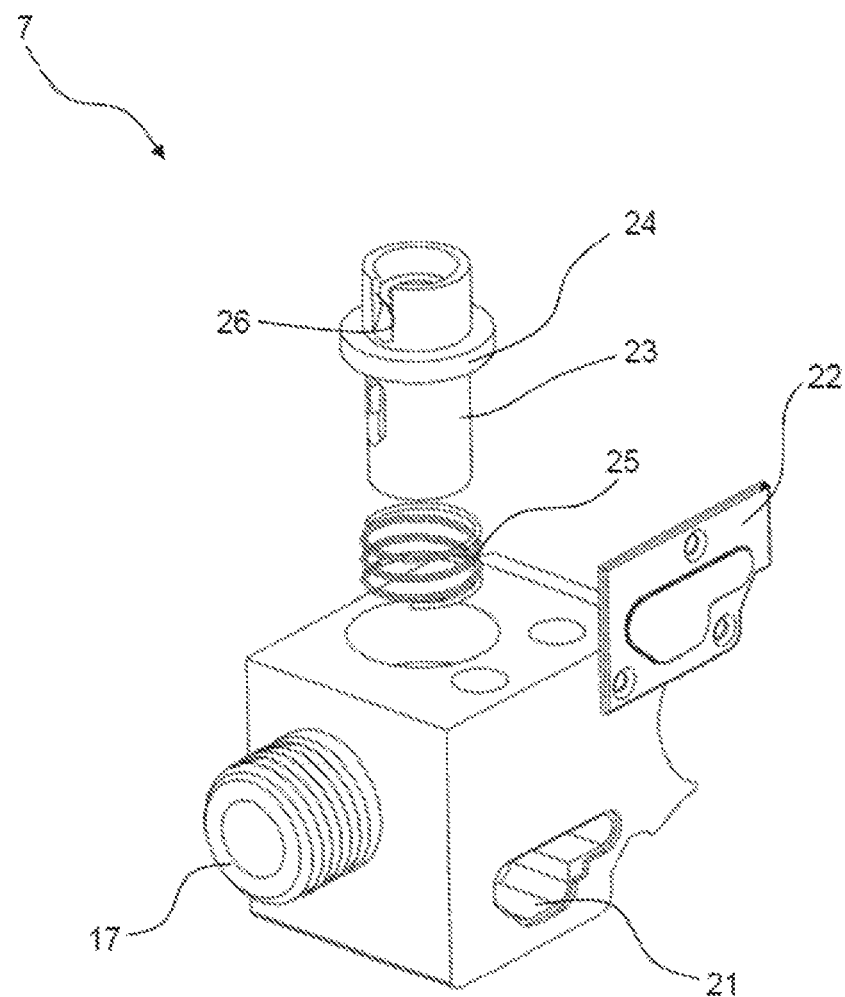
FIG. 5 shows a further schematic perspective exploded view of the gas control valve according to FIG. 3.

FIGS. 4 and 5 show the gas control valve 7 in a schematic perspective exploded view in each instance. The thermoelement receptacle 19 is preferably configured to be removable from the valve housing 16. A recess 21 is provided on the side of the valve housing 16. The recess 21 is fluidically connected to combustion gas ducts provided in the valve housing 16. The recess 21 can be closed in a fluid-tight manner with the aid of a cover 22.

A valve body 23 is rotatably accommodated in the valve housing 16. The valve body 23 is tubular and has a peripheral projection 24. A spring device 25 is positioned between the projection 24 and the valve housing 16. The spring device 25 encompasses the tubular valve body 23 at least in sections. The spring device 25 is preferably a compression spring. The spring device 25 prestresses the valve body 23 such that this is pushed out of the valve housing 16 by the spring device 25.

As FIG. 5 shows, an actuating slot 26 is provided on the valve body 23, into which a corresponding engagement section of the actuating shaft 20 engages in a form-fit manner.

Figure 6:
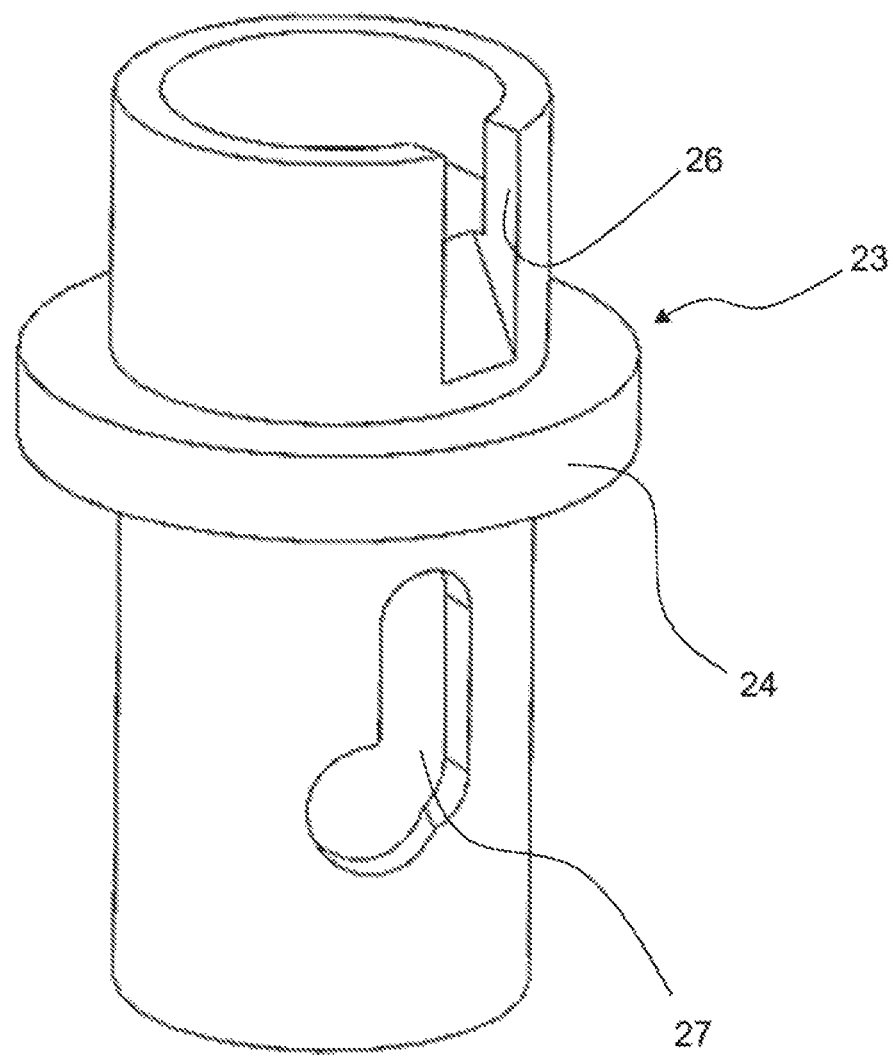
FIG. 6 shows a schematic perspective view of a valve body of the gas control valve according to FIG. 3, and FIGS. 7A to 7D show schematic representations of different positions of an actuating head of the gas valve according to FIG. 3.

FIG. 6 shows a schematic perspective view of the valve body 23. The valve body 23 has a gas aperture 27. When the valve body 23 is rotated in the valve housing 16, the gas aperture 27 overlaps with the gas ducts provided in the valve housing 16.

Figure 7A:
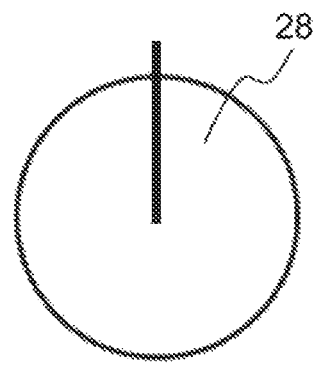
Figure 7B:
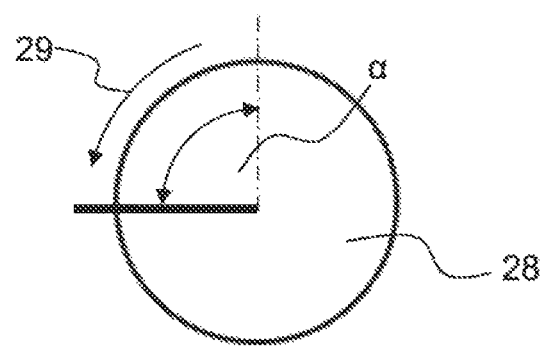

The mode of operation of the gas control valve 7 is explained in more detail on the basis of FIGS. 7A to 7D. FIGS. 7A to 7D each show an actuating button 28 coupled to the actuating shaft 20 of the gas control valve 7 in various positions. FIG. 7A shows the actuating button 28 in a position in which the valve body 23 is in a closed position. In the closed position, the gas control valve 7 is closed and the gas aperture 27 is covered entirely by the valve housing 16. As FIG. 7B shows, the valve body 23 can be rotated in a predetermined direction of rotation 29 from the closed position, in which the gas control valve 7 is closed, into an open position, in which the gas control valve 7 is open. The predetermined direction of rotation 29 is oriented counter clockwise for instance. A rotary angle α between the closed position and the open position is 90° for instance.

Figure 7C:
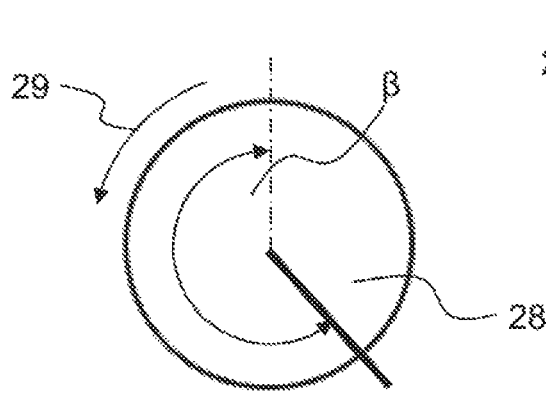

As FIG. 7C shows, in the preferred direction of rotation 29 the actuating button 28 can be rotated beyond the open position into a low-flame position. An angle β between the closed position and the low-flame position is 210° for instance. The gas control valve 7 can be controlled continuously by rotating from the open position shown in FIG. 7B into the low-flame position shown in FIG. 7C. In order to bring the gas control valve 7 from the low-flame position into the closed position, the actuating button 28 is rotated against the predetermined direction of rotation 29 back into the closed position shown in FIG. 7A.

Figure 7D:
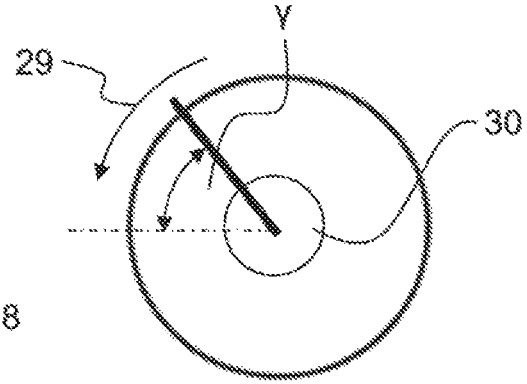

Furthermore, as shown in FIG. 7D, the valve body 23 can be rotated against the predetermined direction of rotation 29 from the open position into what is known as a booster position or maximum-flame position. A rotary angle Y between the open position and the booster position is 30° for instance. A flow volume of combustion gas flowing through the gas control valve 7 is greater in the booster position than in the open position. The flow volume of combustion gas is preferably constant in the booster position and cannot be adjusted continuously. In order to rotate the valve body 23 from the open position shown in FIG. 7B into the booster position shown in FIG. 7D, the valve body 23 can be pressed into the valve housing 16 against a spring force of the spring device 25. In other words, the valve body 23 can only then be rotated into the booster position if this is pressed into the valve housing 16 against the spring force of the spring device 25. A booster gas duct, which fluidically connects the gas aperture 27 of the valve body 23 directly with the gas outlet 17, can be provided in the valve housing 16.

The gas control valve 7 can also have a timer device 30, which is designed to rotate the valve body 23, after a predetermined time interval has elapsed, automatically from the booster position shown in FIG. 7D into the open position shown in FIG. 7B. The predetermined time interval is 30 seconds for instance.

The gas oven 31 (FIG. 1) can have one or a number of gas control valves 7 to 10, as described above, and/or a gas hob 1 of this type.

Although the present invention was described on the basis of exemplary embodiments, it can be modified in a variety of ways.

The invention claimed is:

1. A gas control valve for a hob, comprising:
a valve housing having only a single gas outlet; and
a tubular valve body accommodated in the valve housing, said valve body having exactly one gas aperture disposed on a peripheral wall of the valve body, wherein the valve body is rotatable in a predetermined direction of rotation from a closed position, in which the gas aperture is covered by the valve housing and the gas control valve is closed, into an open position, in which the gas control valve is open;
wherein the valve body is rotatable in the predetermined direction of rotation beyond the open position into a low-flame position;
wherein the gas control valve is continuously adjustable by rotating the valve body between the open position and the low-flame position to control a flow volume of combustion gas flowing through the gas aperture to the single gas outlet; and
wherein the valve body is rotatable against the predetermined direction of rotation from the open position into a booster position, in which the flow volume of combustion gas flowing through the gas aperture is greater than the flow volume of combustion gas in the open position.

2. The gas control valve of claim 1, wherein the flow volume of combustion gas is constant in the booster position.

3. The gas control valve of claim 1, further comprising a timer device configured to rotate the valve body automatically from the booster position into the open position after a predetermined time interval has elapsed.

4. The gas control valve of claim 1, wherein the valve body is pressable into the valve housing to thereby enable a rotation of the valve body from the open position into the booster position.

5. The gas control valve of claim 1, further comprising a spring device applying a spring force, with the valve body being pressable into the valve housing in opposition to the spring force of the spring device.

6. The gas control valve of claim 5, wherein the valve body is configured for accommodation in the spring device.

7. The gas control valve of claim 1, wherein the valve housing is adapted for attachment to a main gas line of the hob.

8. The gas control valve of claim 1, wherein the booster position is disposed between the open position and the closed position.

9. The gas control valve of claim 1, wherein the gas control valve is connectible to only a single burner supply line.

10. A hob, comprising
a gas control valve, said gas control valve comprising a valve housing having only a single gas outlet;
a valve body accommodated in the valve housing;
said valve body having exactly one gas aperture, wherein the valve body is rotatable in a predetermined direction of rotation from a closed position, in which the single gas aperture is covered by the valve housing and the gas control valve is closed, into an open position, in which the gas control valve is open;
wherein the valve body s rotatable in the predetermined direction of rotation beyond the open position into a low-flame position;
wherein a flow volume of combustion gas through the gas aperture to the single gas outlet is continuously adjustable by rotating the valve between the open position and the low-flame position; and
wherein the valve body is rotatable against the predetermined direction of rotation from the open position into a booster position, in which the flow volume of combustion gas flowing through the gas aperture is greater than the flow volume of combustion gas in the open position; and
a thermoelement receptacle attached to the valve housing, the thermoelement receptacle being connected to a thermoelement.

11. The hob of claim 10, wherein the flow volume of combustion gas is constant in the booster position.

12. The hob of claim 10, the gas control device includes a timer device having an actuator configured to rotate the valve body automatically from the booster position into the open position after a predetermined time interval has elapsed.

13. The hob of claim 10, wherein the valve body is pressable into the valve housing to thereby enable a rotation of the valve body from the open position into the booster position.

14. The hob of claim 10, wherein the gas control device includes a spring device applying a spring force, with the valve body being pressable into the valve housing in opposition to the spring force of the spring device.

15. The hob of claim 10, wherein the valve housing is adapted for attachment to a main gas line of the hob.

16. The hob of claim 10, wherein the valve body is tubular.

17. A gas oven, comprising
at least one member selected from the group consisting of:
a gas control valve which includes a valve housing having only a single gas outlet; a valve body accommodated in the valve housing, said valve body having exactly one gas aperture, wherein the valve body is rotatable in a predetermined direction of rotation from a closed position, in which the gas aperture is covered by the valve housing and the gas control valve is closed, into an open position, in which the gas control valve is open, wherein the valve body is rotatable in the predetermined direction of rotation beyond the open position into a low-flame position; wherein a flow volume of combustion gas through the gas aperture to the single gas outlet is continuously adjustable by rotating the valve between the open position and the low-flame position, and a thermoelement receptacle attached to the valve housing, the thermoelement receptacle being connected to a thermoelement;
wherein the valve body is rotatable against the predetermined direction of rotation from the open position into a booster position, in which the flow volume of combustion gas flowing through the gas aperture is greater than the flow volume of combustion gas in the open position; and
a hob comprising said gas control valve.

* * * * *